Dec. 13, 1966  J. H. HARKER ETAL  3,290,864
GAS SEPARATION PUMP FOR LIQUID CIRCULATING SYSTEMS
Filed Aug. 10, 1965  2 Sheets-Sheet 2

INVENTORS
JOHN H. HARKER
JACK KEYES
BY
ATTORNEY

United States Patent Office 3,290,864
Patented Dec. 13, 1966

3,290,864
GAS SEPARATION PUMP FOR LIQUID CIRCULATING SYSTEMS
John H. Harker, Park Ridge, and Jack Keyes, Glencoe, Ill., assignors to International Telephone and Telegraph Corporation, New York, N.Y., a corporation of Maryland
Filed Aug. 10, 1965, Ser. No. 478,578
3 Claims. (Cl. 55—203)

This invention relates to pumps for separating gases from the liquid circulating in a closed system.

Heretofore, and particularly in closed pressurized hot water heating systems, structure has been provided for trapping gases released from the circulating water, these gases being trapped in a tank also providing a reservoir for the water as it expands and contracts. Customarily structure has been provided at the boiler for separating such gases and directing them to the expansion tank where similar structure is provided to complete the separation of the gases from the water.

According to the present invention, it is unnecessary to provide structure as previously described, the separation being accomplished by a system circulating pump constructed in a unique fashion and connected into the system.

With the foregoing considerations in mind, it is a principal object of this invention to provide an improved circulating pump characterized by structure for causing the separation of entrained gases in the water, and for diverting the same to structure where the separation is completed.

Still another object is to provide a circulating pump having structure for enabling entrained gases to be separated at the intake side of the pump, and to be diverted into a chamber also at the intake side thereof prior to being further diverted to the conventional expansion tank of the system.

Yet another object is to provide a gas separating pump where the separation of gases from the pumped liquid is effected at the inlet chamber of the pump, it having part of the pump impeller structure rotating therein for imparting a vortex motion to the incoming liquid, such structure cooperating with fixed structure for educting the detrained gases into a chamber partitioned off from the inlet chamber and connected to the expansion tank of a circulating system.

Other objects and important features of the invention will be apparent from a study of the following specification taken with the drawings, which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

Figure 4:
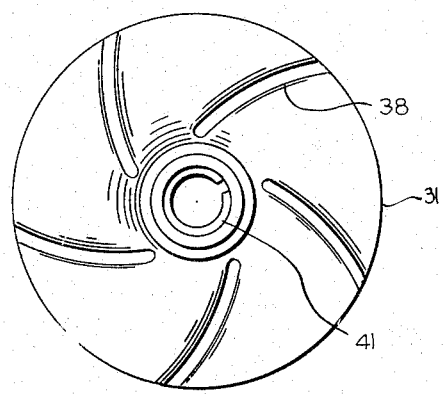
Figure 5:
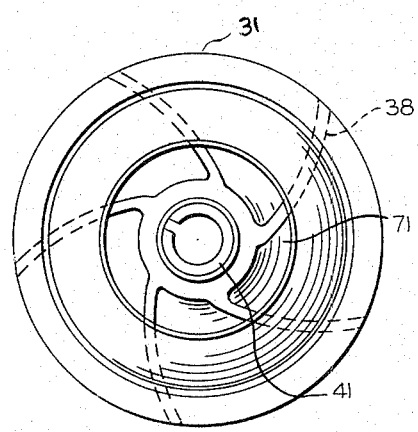

FIG. 4 is an elevation view of the pump impeller taken along the line 4—4 of FIG. 3, looking in the direction of the arrows with stamping 36, set forth below, removed; and FIG. 5 is an elevational view of the pump impeller looking in the direction of the arrows 5—5 of FIG. 3.

Figure 1:
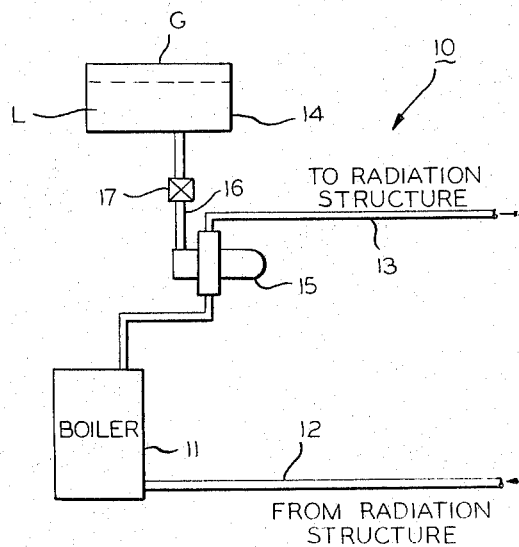
FIG. 1 is a schematic view showing a liquid circulating system having the improved gas separation pump according to the present invention embodied therein.

Referring now particularly to FIG. 1 of the drawings, the improvement in the gas separating pump according to the present invention is best seen with respect to a liquid circulating system such as a hot water heating system referred to generally by the reference numeral 10, and including a boiler 11 having a supply main 12 connected to radiation structure, not shown, and a return main 13 also connected to such radiation structure. In order to produce circulation in supply and return mains 12 and 13 and the radiation structure a pump indicated generally by the reference numeral 15 is connected in the supply main 12. One of the features of the present invention is the provision in the pump 15 of structure for separating gases, usually air, from the system water, such entrained gas being separated by the pump 15 and led from pump 15 to an expansion tank 14 by a line 16.

As seen in FIG. 1, the expansion tank 14 has a supply of water L therein, the quantity of which varies according to the expansion or contraction of the liquid in the system. A quantity of entrapped gas G is maintained under pressure above the level of the water in the tank 14.

The line 16 may have a vent 17 therein, which is operative when all the liquid is returned from the tank 14 to the system, the valve 17 venting excess gas, and enabling the liquid to move to the tank 14 upon expansion thereof.

Figure 2:
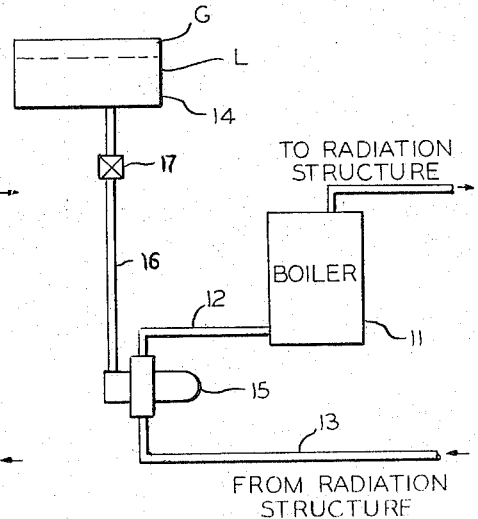
FIG. 2 is a view similar to FIG. 1, but showing an alternate way of connecting the gas separating pump into the system.

Referring now to FIG. 2 of the drawings, there is shown a system similar to that seen in FIG. 1, the difference being that the pump 15 is connected in the return line 13 to the boiler 11 instead of being connected to the supply main 12. Irrespective of the mode of connection of the pump 15, it is provided with structure whereby gas is separated from the circulating liquid to be directed to the tank 14, said tank also having a quantity of gas G held under pressure above the level of the water L in the tank 14. Also, the line 16 connecting the pump 15 to the tank 14 is provided with valve means 17 for bleeding excess gas from the tank 14, so as to permit the tank 14 to store a quantity of the expanded water L.

Figure 3:
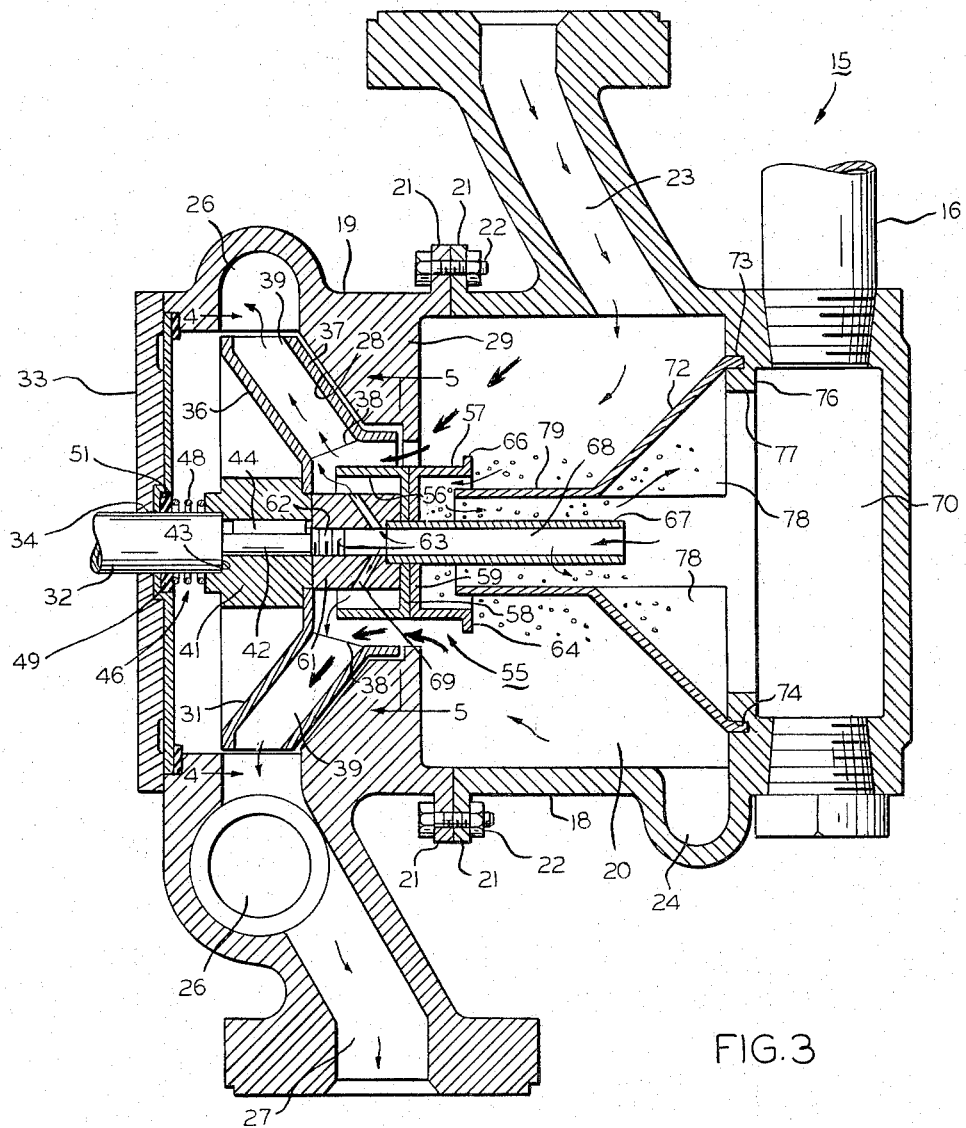
FIG. 3 is a vertical section taken through the gas separating pump of the systems of FIGS. 1 and 2.

Referring now to FIGS. 3 to 5 of the drawings, the pump 15 seen in FIG. 1 is of the centrifugal type and includes a pump inlet body 18 connected to a pump output body 19, the two pump bodies having confronting flanges 21 connected by a plurality of through bolts 22. Pump inlet body 18 has an entrance passage 23 which is coterminous with an inlet volute 24 designed to give a vortical movement to the entering liquid, so that the said movement is generally continuous through an inlet chamber 20 within pump inlet body 18.

Pump output body 19 has a volute discharge chamber 26 connected to a discharge passageway 27. The volute discharge chamber 26 is coterminous with a generally frusto-conical pump impeller cavity 28. A generally annular shaped web 29 separates the inlet chamber 20 from the pump impeller cavity 28.

A pump impeller 31 is adapted to turn within pump impeller cavity 28 and is mounted on a driving shaft 32. An end closure 33 for the pump output body 19 is secured along its periphery in any convenent manner to the output body 19, and driving shaft 32 passes through a shaft opening 34 in closure 33. Shaft 32 and end closure 33 may be part of any suitable prime mover, not shown, for pump 15. Shaft 32 is suitably supported on bearings, a part of such prime mover.

Pump impeller 31 is formed from a pair of stampings 36 and 37, the former being passed through a coining operation to provide a plurality of arcuate ribs 38, which between them define impeller passageways 39. Ribs 38 of the stamping 36 are joined along their lines of contact with stamping 37 by spot welding. The precise configuration of the impeller as described forms no part of the invention. Impeller 31, as described, is adapted to be press fitted on a hub 41 held to a reduced diameter portion 42 of drive shaft 32 and against a shoulder 43 on shaft 32. A key 44 holds hub 41 for rotation with shaft 32.

A seal 46 for shaft 32 is interposed between hub 41 and closure disk 33 and consists of a spring 48 having one end bearing against a packing member 49 held in a recess 51 on the inner face of closure 33 and its other end bearing against hub 41. The precise form of seal 46 forms no part of the present invention.

Structure is provided for holding the impeller 31 on the shaft 32 and for providing paths for the movement of gases desired to be separated at the inlet chamber 20 from the pumped liquid, and for introducing gas-free liquid to the eye of the pump impeller 31. Such structure comprises a locking assembly 55 for impeller 31. Locking assembly 55 includes a pair of essentially cup-shaped annuli 56 and 57 having their respective disc base flanges 58 and 59 in abutting relation. The two annuli 58 and 59 are welded together, and flange 58 is welded to a nut 61 which is threaded on its interior as at 62 to engage a threaded reduced diameter portion 63 of pump shaft 32.

In order to secure the nut 61 tightly on shaft 32 and into a position of firm engagement with hub 41 of impeller 31, annulus 59 has a rim flange 64 provided with a plurality of flats 66 adapted to be engaged with a conventional wrench, not shown.

Locking assembly 55 also includes structure for providing a path for gas-free liquid to the axis of rotation of impeller 31 and to this end nut 61 is coaxial with a liquid guide tube 67 defining a passage 68 for such liquid. Nut 61 has a plurality of essentially radial passages 69, so that tube 67 communicates with pumping passages 71 in impeller 31.

Structure is provided in the pump inlet chamber 20 for separating out entrained gases from the liquid entering pump 15 at the entrance passageway 23 and diverting such separated gases into a gas collecting static chamber 70 connected by the line 16 to the expansion tank 14 seen in FIGS. 1 and 2. Gas collecting static chamber 70 flanks the pump inlet chamber 20 and is separated therefrom by a frusto-conical partition 72 having a rim flange 73 which is press-fitted into a circular recess 74 in a wall or web 76 separating pump chamber 20 from gas collecting static chamber 70.

A circular opening 77 in web 76 provides communication of the interior of frusto-conical partition 72 with chamber 70, and frusto-conical partition 72 has a plurality of radial ribs 78 as seen in FIG. 3. A cylindrical extension 79 from partition 72 is coaxial with the guide tube 67 and extends to a point spaced a small distance from the web 59 of annulus 57 so as to provide pumping path indicated by the arrows seen in FIG. 3 for separating gas from the liquid being pumped.

An additional path for pumped liquid is also provided around the locking assembly 55 and into the eye of the impeller 31 as shown by the heavy arrows in FIG. 3.

As the pump 15 operates, a swirling or vortiginous movement is imparted to the liquid entering pump 15. This is accomplished by the entrance volute 24 in addition to that accomplished by the rotative movement of that part of the locking assembly extending within the inlet chamber 20. As the pump 15 operates, there is a pressure gradient in the entrant liquid, varying from a maximum at the peripheral portions of the inlet chamber 20 to a minimum at the center thereof at the axis of rotation of impeller 31. The pumping action of that part of the locking assembly 55 extending within the inlet chamber additionally tends to compress any entrained gas in the entrant liquid, and the so-entrained gas will tend to move to the portions of the inlet chamber having the lowest pressure therein, i.e., at the center of rotation of impeller 31.

In addition, there is a normal centripetal accelerating force acting in the lighter gaseous elements forcing them toward the center of rotation. The path of such entrained gaseous elements is shown in FIG. 3, and they move from the outside of the cylindrical extension 79 to the interior thereof along the tube 67. The whirling action of the bubbles diminishes as they move along the outer surface of tube 67, and as they approach the end of tube 67 they are free to rise along the interior of the frusto-conical partition 72 and into the chamber 70 where they continue their rise to the expansion tank 14.

The movement described is made possible by the interior of tube 67 communicating with the eye of impeller 31 precisely at its center of rotation, where the suction pressure is the greatest. The liquid which has been separated of its entrained gas then moves freely into the eye of impeller 31.

An important feature of the invention, it will be apparent, is the provision of a flow path or pattern for gas entrained liquid wherein the gas is separated therefrom and substantially only gas-free liquid reaches the impeller. In this connection it may be noted that liquid enters impeller 31 also at the cylindrical opening around the locking assembly 55, the pumped liquid entering thereat is substantially free of gas entrainment, the gas-entrained liquid moving as previously described.

It will be seen from the description foregoing that some new and useful improvements in gas separation pumps has been provided. Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

We claim:

1. In a pump operable to separate gases from a liquid circuit, a pump housing having a pumping chamber, an inlet chamber and a gas collecting static chamber, a pump shaft having an impeller mounted thereon and adapted to turn said impeller in said pumping chamber, means for separating gas entrained in the liquid entering said inlet chamber and diverting said gas to said gas collecting static chamber comprising a frusto-conical partition separating said inlet chamber from said gas collecting static chamber, a cylindrical extension from said partition coaxial with said impeller and having an end thereof spaced from said impeller, a tube extending from said impeller along the turning axis thereof and defining with said impeller a passageway for gas-free liquid, returning from said collecting static chamber, said last named tube being nested within said cylindrical extension, said tube and said extension providing an annular passageway for movement of gas-entrained liquid into said gas collecting static chamber for separation of gas therefrom.

2. The invention of claim 1 wherein said tube extending from said impeller is part of a locking assembly therefor, and wherein said locking assembly rotates with said impeller to impart vortiginous movement to the liquid in said inlet chamber.

3. The invention of claim 2 wherein said locking assembly includes a nut threaded to said pump shaft, and wherein said nut is provided with passageways connecting said tube with said impeller.

References Cited by the Examiner

UNITED STATES PATENTS 2,216,542  10/1940  Paige.
2,736,266  2/1956  Eisele.

RUEBEN FRIEDMAN, *Primary Examiner.*

R. BURKS, *Assistant Examiner.*